US012730738B2

(12) United States Patent
Hazarika et al.

(10) Patent No.: US 12,730,738 B2
(45) Date of Patent: Sep. 8, 2026

(54) SYSTEMS AND/OR METHODS FOR INTELLIGENT INDEXING AND SELECTIVE EXECUTION OF DISTRIBUTED TESTS IN ORGANIZATIONS

(71) Applicant: Software GmbH, Darmstadt (DE)

(72) Inventors: Rinku Hazarika, Bangalore (IN); Manoj Jannu, Baad (IN)

(73) Assignee: Software GmbH, Darmstadt (DE)

( * ) Notice: Subject to any disclaimer, the term of this patent is extended or adjusted under 35 U.S.C. 154(b) by 237 days.

(21) Appl. No.: 18/392,176

(22) Filed: Dec. 21, 2023

(65) Prior Publication Data

US 2025/0208983 A1 Jun. 26, 2025

(51) Int. Cl.
*G06F 11/3668* (2025.01)
*G06F 11/3698* (2025.01)

(52) U.S. Cl.
CPC ........ *G06F 11/3688* (2013.01); *G06F 11/368* (2013.01); *G06F 11/3698* (2025.01)

(58) Field of Classification Search
CPC . G06F 11/3688; G06F 11/368; G06F 11/3698
See application file for complete search history.

(56) References Cited

U.S. PATENT DOCUMENTS 12,189,518 B2 * 1/2025 Mietke .................. G06F 11/368
12,271,293 B1 * 4/2025 Chauhan ............. G06F 11/3688
2016/0378647 A1 * 12/2016 Maeoka .................. G06F 11/36 717/124
2018/0260312 A1 * 9/2018 Strachan ................... G06F 8/71
2020/0125485 A1 * 4/2020 Wiener ............... G06F 11/3698
2020/0242015 A1 * 7/2020 Catt ..................... G06F 11/3684
2024/0118996 A1 * 4/2024 Mistry ................ G06F 11/3684

* cited by examiner

*Primary Examiner* — Wei Y Mui
*Assistant Examiner* — Travis Viet Tran
(74) *Attorney, Agent, or Firm* — Nixon & Vanderhye, PC

(57) ABSTRACT

A software product development- and testing-related system receives an indication of code related to software being developed. A configuration structure is updated to include an entry for the code, and the code is stored to a test code repository, if it relates to a new test for the software. The entry specifies part(s) of the software to which the code is applicable. If the code is an update to a test already in the test code repository, the code is stored to the test code repository. If the code is product development code related to the software: one or more tests applicable to the code is/are identified using the configuration structure; each identified test is run on the code; and provided that each identified test is passed, the code is promoted to a product code repository for use with the software (otherwise a developer is alerted of a failure).

29 Claims, 11 Drawing Sheets

| Modules | A | B | C | D | E |
|---|---|---|---|---|---|
| A | Y | Y | Y | N | N |
| B | N | Y | N | Y | Y |
| C | N | Y | Y | Y | Y |
| D | N | Y | N | Y | Y |
| E | Y | Y | Y | Y | Y |

Fig. 6

| TestID | Product | Module | Tests_ | Repository | Tag(*) |
|---|---|---|---|---|---|
| TC001 | Application1 | A | Verify_Module_A_for_functionality_H | C2E/TestRepo_A_Tests | A_function_H |
| TC002 | Application1 | A,B | Verify_ModuleIntegration_AB_for_functionality_I | C2E/TestRepo_AB_Tests | AB_function_I |
| TC003 | Application1 | A,C | Verify_ModuleIntegration_AC_for_functionality_J | C2E/TestRepo_AC_Tests | AC_function_J |
| TC004 | Application1 | A,D | Verify_ModuleIntegration_AD__for_functionality_K | C2E/TestRepo_AD_integration | AD_function_K |
| TC005 | Application1 | A,E | Verify_ModuleIntegration_AE_for_functionality_L | C2E/TestRepo_AE_integration | AD_function_L |
| TC006 | Application1 | B | Verify_Module_B_for_functionality_M | C2E/TestRepo_B_Tests | B_function_M |
| TC007 | Application1 | B,D | Verify_ModuleIntegration_BD_for_functionality_N | C2E/TestRepo_BD_integration | BD_function_N |
| TC008 | Application1 | B,E | Verify_ModuleIntegration_BE_for_functionality_O | C2E/TestRepo_BE_integration | BD_function_O |
| TC009 | Application2 | C | Verify_Module_C_for_functionality_P | C2E/TestRepo_C_Tests | C_function_P |
| TC010 | Application2 | C,B | Verify_ModuleIntegration_CB_for_functionality_Q_Test1 | C2E/TestRepo_CB_Tests | CB_function_Q_Test1 |
| TC011 | Application2 | C,D | Verify_ModuleIntegration_CD_for_functionality_R | C2E/TestRepo_CD_Tests | CD_function_R |
| TC012 | Application2 | C,E | Verify_ModuleIntegration_CE_for_functionality_S | C2E/TestRepo_CE_Tests | CE_function_S |
| TC013 | Application2 | D | Verify_Module_D_for_functionality_T | C2E/TestRepo_D_Tests | D_function_T |
| TC014 | Application2 | D,B | Verify_ModuleIntegration_DB_for_functionality_U | C2E/TestRepo_DB_Tests | DB_function_U |
| TC015 | Application2 | D,E | Verify_ModuleIntegration_DE_for_functionality_V | C2E/TestRepo_DE_integration | DE_function_V |
| TC016 | Application3 | E | Verify_Module_E_for_functionality_W | C2E/TestRepo_E_Tests | E_function_W |
| TC017 | Application3 | E,A | Verify_ModuleIntegration_EA_for_functionality_X | C2E/TestRepo_EA_Tests | EA_function_X |
| TC018 | Application3 | E,B | Verify_ModuleIntegration_EB_for_functionality_Y | C2E/TestRepo_EB_Tests | EB_function_Y |
| TC019 | Application3 | E,C | Verify_ModuleIntegration_EC_for_functionality_Z | C2E/TestRepo_EC_integration | EC_function_Z |
| TC020 | Application3 | E,D | Verify_ModuleIntegration_ED_for_functionality_Z1 | C2E/TestRepo_ED_integration | ED_function_Z1 |

Fig. 7

```
package com.test.application2.moduleC;
import org.testng.annotations.Test;
import org.openga.seleniun.WebDriver;
import org.openqa.selenium.chrome.ChromeDriver;
import static org.testng.Assert.*;

public class IntegrationModuleC_B_Tests {

  @Test(priority = 1, groups = { "CB_function_Q Test1" })
  public void Verify_Module_CB_for_functionality_Q_Test1() {
     /*
     Test script to validate the functionality
     assertTrue(true);
     */
  }

/*newly added a test for the integration of module C and
   module B, specifically for test2 */
  @Test(priority = 2, groups = { "CB_function_Q_Test2" })
  public void Verify_Module_CB_for_functionality_Q_Test2() {
     /*
      Test script to validate the functionality
      assertTrue(true);
     */
  }
}
```

Fig. 8

| TC011 | Application2 | C,B | Verify_Module_C-B_for_functionality_Q_Test2 | C2E/TestRepo_CB_Tests | Test_CB_function_Q_Test2 |
|---|---|---|---|---|---|

Fig. 9

| TestID | Product | Module | Tests_ | Repository | Tag(*) |
|---|---|---|---|---|---|
| TC001 | Application1 | A | Verify_Module_A_for_functionality_H | C2E/TestRepo_A_Tests | A_function_H |
| TC002 | Application1 | A,B | Verify_ModuleIntegration_AB_for_functionality_I | C2E/TestRepo_AB_Tests | AB_function_I |
| TC003 | Application1 | A,C | Verify_ModuleIntegration_AC_for_functionality_J | C2E/TestRepo_AC_Tests | AC_function_J |
| TC004 | Application1 | A,D | Verify_ModuleIntegration_AD__for_functionality_K | C2E/TestRepo_AD_integration | AD_function_K |
| TC005 | Application1 | A,E | Verify_ModuleIntegration_AE_for_functionality_L | C2E/TestRepo_AE_integration | AD_function_L |
| TC006 | Application1 | B | Verify_Module_B_for_functionality_M | C2E/TestRepo_B_Tests | B_function_M |
| TC007 | Application1 | B,D | Verify_ModuleIntegration_BD_for_functionality_N | C2E/TestRepo_BD_integration | BD_function_N |
| TC008 | Application1 | B,E | Verify_ModuleIntegration_BE_for_functionality_O | C2E/TestRepo_BE_integration | BD_function_O |
| TC009 | Application2 | C | Verify_Module_C_for_functionality_P | C2E/TestRepo_C_Tests | C_function_P |
| TC010 | Application2 | C,B | Verify_ModuleIntegration_CB_for_functionality_Q_Test1 | C2E/TestRepo_CB_Tests | CB_function_Q_Test1 |
| TC011 | Application2 | C,B | Verify_ModuleIntegration_CB_for_functionality_Q_Test2 | C2E/TestRepo_CB_Tests | CB_function_Q_Test2 |
| TC012 | Application2 | C,D | Verify_ModuleIntegration_CD_for_functionality_R | C2E/TestRepo_CD_Tests | CD_function_R |
| TC013 | Application2 | C,E | Verify_ModuleIntegration_CE_for_functionality_S | C2E/TestRepo_CE_Tests | CE_function_S |
| TC014 | Application2 | D | Verify_Module_D_for_functionality_T | C2E/TestRepo_D_Tests | D_function_T |
| TC015 | Application2 | D,B | Verify_ModuleIntegration_DB_for_functionality_U | C2E/TestRepo_DB_Tests | DB_function_U |
| TC016 | Application2 | D,E | Verify_ModuleIntegration_DE_for_functionality_V | C2E/TestRepo_DE_integration | DE_function_V |
| TC017 | Application3 | E | Verify_Module_E_for_functionality_W | C2E/TestRepo_E_Tests | E_function_W |
| TC018 | Application3 | E,A | Verify_ModuleIntegration_EA_for_functionality_X | C2E/TestRepo_EA_Tests | EA_function_X |
| TC019 | Application3 | E,B | Verify_ModuleIntegration_EB_for_functionality_Y | C2E/TestRepo_EB_Tests | EB_function_Y |
| TC020 | Application3 | E,C | Verify_ModuleIntegration_EC_for_functionality_Z | C2E/TestRepo_EC_integration | EC_function_Z |
| TC021 | Application3 | E,D | Verify_ModuleIntegration_ED_for_functionality_Z1 | C2E/TestRepo_ED_integration | ED_function_Z1 |

Fig. 10

Figures 11, 12:
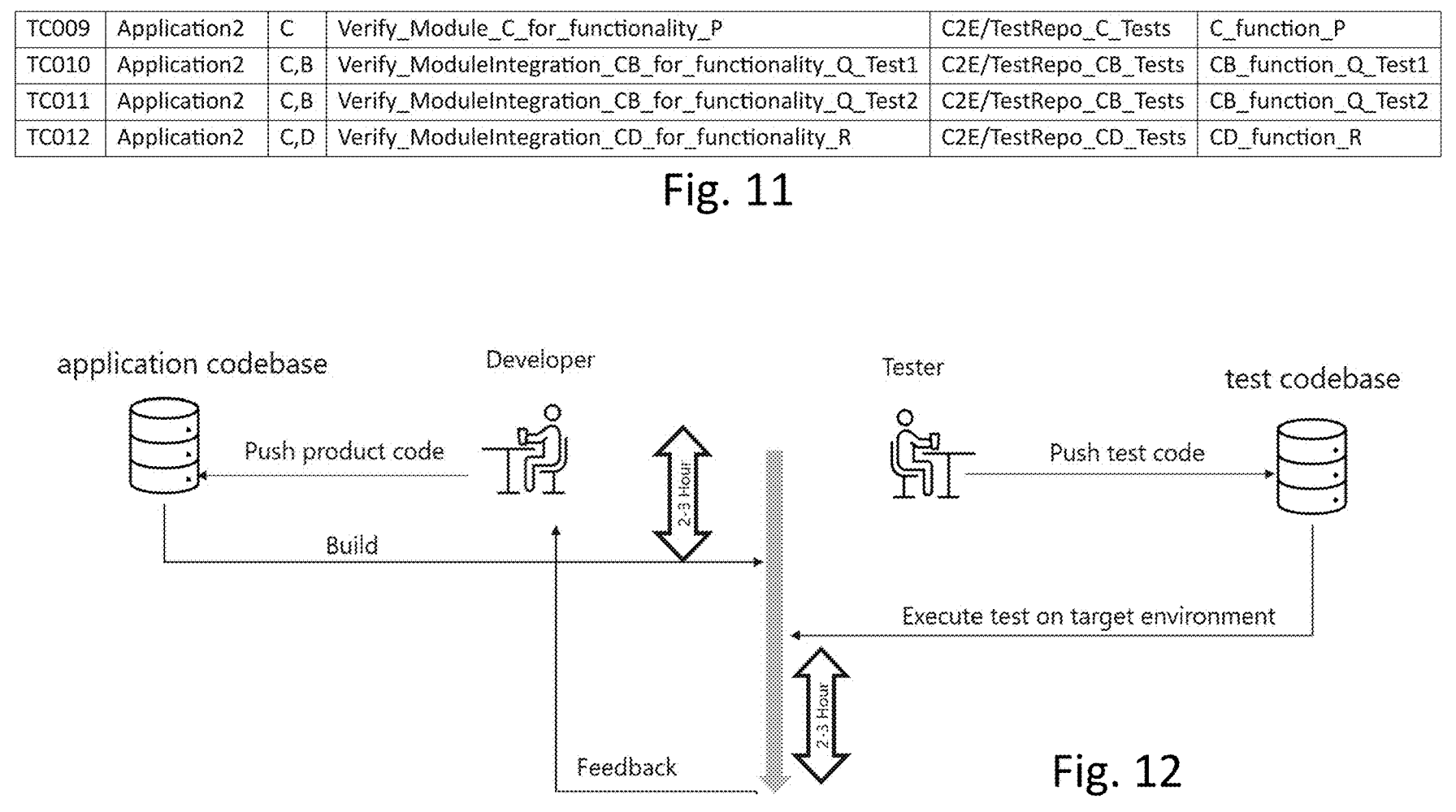

| TC009 | Application2 | C | Verify_Module_C_for_functionality_P | C2E/TestRepo_C_Tests | C_function_P |
|---|---|---|---|---|---|
| TC010 | Application2 | C,B | Verify_ModuleIntegration_CB_for_functionality_Q_Test1 | C2E/TestRepo_CB_Tests | CB_function_Q_Test1 |
| TC011 | Application2 | C,B | Verify_ModuleIntegration_CB_for_functionality_Q_Test2 | C2E/TestRepo_CB_Tests | CB_function_Q_Test2 |
| TC012 | Application2 | C,D | Verify_ModuleIntegration_CD_for_functionality_R | C2E/TestRepo_CD_Tests | CD_function_R |

SYSTEMS AND/OR METHODS FOR INTELLIGENT INDEXING AND SELECTIVE EXECUTION OF DISTRIBUTED TESTS IN ORGANIZATIONS

TECHNICAL FIELD

Certain example embodiments described herein relate to improvements in software product development and testing computing environments. More particularly, certain example embodiments described herein relate to tools that facilitate more synchronous and automated testing of product code being developed, e.g., using a configuration structure (e.g., a central index).

BACKGROUND AND SUMMARY

Computer software code for a product can be developed in a variety of different ways using a variety of different computing tools. A relatively recent trend involves such product code being developed in accordance with a continuous integration and continuous delivery (CI/CD) development model. According to this development model, during the coding phase, for example, product code developers write code based on design specifications. Developers make use of programming languages, technology frameworks (including hardware frameworks, codebases, etc.), software libraries, and other technology tools to implement the desired functionality. It is desirable for coding standards and best practices to be followed, e.g., to help ensure readability, maintainability, etc., with respect to the product being developed and with respect to its constituent parts.

Software oftentimes is developed in units. These units may correspond to components, modules, or other parts that together form the product. Once the individual units are implemented, they are integrated to create a working system. Integration involves combining the different units and ensuring that they work together correctly. With regard to the latter, for example, integration testing is performed to test the interaction between various parts of the software.

FIG. 1A is a diagram showing a "traditional" software development lifecycle (SDLC). The horizontal arrow shows "time" moving from initial stages at the left to later stages to the right, and the vertical arrow shows resource impact with lower resource impact being at the top and resource impact growing as the direction of the arrow is followed. In FIG. 1A, the SDLC begins with software requirements specification (SRS) drafting, and test estimation. An SRS may be thought of as being a document that describes what the software will do and how it will be expected to perform. Test estimation is a procedure that involves approximating how long a test task would take to complete. Following SRS definition and test estimation, development of units takes place and unit testing is performed. Once units are believed to be working properly, initial quality assurance (QA) testing takes place, which oftentimes is a comparatively more resource-intensive task. Bug fixes may be implemented as a result of the initial QA testing, and yet more resource-intensive further QA testing will take place. As will be appreciated from FIG. 1A, and consistent with typical CI/CD development model use cases, testing oftentimes will come late in code's lifecycle and is burdensome for developers. It will be appreciated that the terms "QA," "QA testing," and the like encompass a variety of different test scenarios including, for example, functionality tests, usability tests, integration tests, reliability tests, etc.

Those skilled in the art have realized the importance of software testing generally. Those skilled in the art also have recognized impacts associated with having one or more testing phases later in the overall SDLC. With regard to the latter, as will be appreciated by those skilled in the art, it oftentimes is challenging when bugs are identified towards the end of the SDLC. These bugs can be technically challenging to resolve (e.g., because of the added complexity of the integration, the fact that a fix to one unit might cause an error in another, etc.). Bug fixes made towards the end of the SDLC therefore tend to be resource intensive, both in terms of the time and technical efforts needed for resolution.

As an example, when a crucial bug is identified at the end of the SDLC, it may be difficult or impossible to timely release mission-critical or other software, potentially yielding large losses. Indeed, there are situations where bug identification during the last stage has caused releases to be delayed and, at times, software solutions being scrapped entirely because the time-to-fix was deemed simply not worth it.

FIG. 1B is a diagram showing an improvement to the SDLC, reflective of a "Shift Left" approach. The Shift Left approach focuses on involving testers in more stages of the program's development, including (or especially) at earlier-on critical stages. As shown in FIG. 1B, for example, QA testing is a comparatively longer process, but it takes place simultaneously with the development and unit testing, and bug fix, phases of the SDLC. Bug fixing and QA testing occur earlier in the SDLC and thus are "shifted left" with the timeline shown in FIG. 1B, hence the name of this development approach. Implementing this approach enables testers in some instances to divert at least some of their focus from defect detection (which otherwise would typically occur later in the SDLC) to defect prevention (which could now occur earlier in the SDLC). The Shift Left approach reflects the overall importance of testing, and testers themselves have roles and responsibilities (e.g., with regard to product development) that can become more important than they might otherwise be with a traditional SDLC approach.

As alluded to above, with the Shift Left approach, the testing team does not simply focus on testing the software to identify bugs. Instead, the testing team can more proactively work with the development team, e.g., from the initial stages to plan and build a robust and effective testing strategy. For example, the testing team can provide guidance to the development team and focus on the long-term vision of the product, rather than merely taking responsibility for the testing work as a separate and distinct aspect of the SDLC.

The Shift Left approach thus provides testers with the opportunity to help design the tests early in the SDLC. In so doing, tests can focus on the user experience and user expectations that in turn can enable developers to develop the software based on these tests. And by focusing on these aspects, developers are better positioned to design and implement better and/or more responsive products. It is noted that the Shift Left approach does not impact only testers. Moving testing "to the left" and carrying out testing activities continuously also allows developers to take more ownership of their code and can increase their roles in and responsibility for testing.

Although the Shift Left approach is advantageous, there unfortunately are a number of technical challenges to its implementation, and it would be desirable to make technical improvements to these and/or other areas. One technical challenge relates to sequential operation. In this regard, in a more conventional development approach, the development and testing phases ordinarily operate in a sequential manner.

First, the developer writes code and pushes it to a version control system (VCS). Then, the QA team tests the modules after they have been committed to the VCS. But even with the Shift Left approach, some code needs to be committed to the version control system before it can be tested. There is therefore a challenge in knowing what to test, and when to test it.

A second technical challenge relates to the dependency on test execution and feedback. A developer's progress is partially dependent on the execution of tests and the feedback received from the testing team. If the tests fail or if issues are identified during testing, the developer may need to make changes and repeat the process.

A third technical challenge relates to waiting time. Once the developer pushes changes to the version control system, there may be a waiting period before the QA team is able to test the modules, and there may be another waiting period associated with the time it takes to actually perform the testing. The waiting time can vary depending on, for example, the size of the testing team, their workload, the complexity of the changes, challenges in identifying what tests should be run, etc.

A fourth technical challenge relates to potentially reduced development speed. The sequential nature of this model and the waiting time for testing unfortunately can lead to a slower overall development speed. The developer may have to wait for feedback and bug fixes before being able to proceed with further development tasks. Thus, development, and potentially the overall SDLC, can be prolonged, despite the basic intention of the Shift Left approach.

For instance, if a code change is made to an authentication and authorization module by the developer, it needs to be pushed to the product source code repository. Once this module has been added to the repository, QA testers will be notified, and they will execute relevant tests to validate the changes. This flow is sequential, and completing it can involve a significant amount of waiting time on the part of the developer. For example, the developer typically must wait until QA testers initiate their tests and signal that it is acceptable to proceed with committing and/or deploying the code. In cases of failures, the developer needs to repeat the process until QA testers approve the code changes. This developer-QA dependency can add further (and otherwise productive) time to the overall SDLC timeline.

A fifth technical challenge relates to issues with communication and collaboration. The model thrives when there is effective communication and collaboration between the developer and the QA team. Clear communication of requirements, issues, and feedback helps smooth progress and reduce delays. However, current tools do not lend themselves well to meeting these needs. For instance, although developer and QA teams may communicate among themselves using various tools and methods, cross-team communications are not always so straightforward. Moreover, although messaging applications like Slack and Microsoft Teams can be used to enable chats in real-time, and although documents and information can be shared through email and project management software for example, these tools are not really designed to facilitate collaboration both among and between these specific groups for product development purposes.

A sixth technical challenge relates to the nature of the iterative process. If issues are identified during testing, the developer may need to iterate on the code, fixing bugs and/or making improvements based on the QA team's feedback. This iterative process may continue until the modules pass all of the required tests and meet desired quality standards.

A seventh technical challenge relates to quality assurance itself. The involvement of a dedicated QA team helps ensure the quality of the software. Their testing activities help identify bugs, vulnerabilities, and usability issues before the software is released to end-users.

Ensuring timely communication of any code changes aids in the overall SDLC, regardless of whether the communication relates to the development of a new feature or a minor adjustment in the implementation. For example, during integration testing, there is a typical scenario where changes from multiple developers are integrated and tested in a single build. When an issue is encountered by QA testing, the subsequent debugging and issue identification process oftentimes will demand extra time and effort because of the complexities associated with the integration and having "multiple cooks in the [developer] kitchen." In certain instances, this situation might even necessitate multiple back-and-forth interactions between developers in their pursuits to uncover the root cause(s) and/or implement the fix(es). It has been observed that this can culminate in delays in the production of the final software product build.

The process of QA feedback and developer response in iterations might distract developers from other important tasks that they are to perform. And at times, this tendency towards distraction unfortunately can lead to a decrease in focus and/or a change in quality.

Overall, the Shift Left model emphasizes the importance of thorough testing and quality assurance. Unfortunately, however, it may introduce delays in the development process, e.g., related to the sequential nature and waiting times associated with testing and feedback.

Certain example embodiments help address the above-described and/or other concerns. For example, certain example embodiments help improve the SDLC and, for example, offer improvements to the Shift Left approach to software development and testing.

Certain example embodiments provide a framework for indexing and organizing tests across an organization, enabling selective test execution by individuals from anywhere. Leveraging these techniques and distributing test execution improves left shifting of tests in the overall SDLC, helps optimize resource utilization, and can reduce overall the time and effort required for testing activities.

In certain example embodiments, a software product development- and testing-related system is provided. A data store stores a configuration structure. A memory and at least one processor are configured to cooperate to perform operations comprising: receiving an indication of code related to a software product being developed; updating the configuration structure to include an entry for the code and storing the code to a test code repository, provided that the code relates to a new test for the software product being developed, wherein the entry specifies one or more parts of the software product being developed to which the code is applicable; and storing the code to the test code repository, provided that the code is an update to a test already existing in the test code repository. Provided that the code is product development code related to the software product being developed: one or more tests applicable to the code is/are identified using the configuration structure; each identified test is automatically run on the code; and provided that each identified test is passed, the code is promoted to a product code repository for use with the software product being developed, and otherwise alerting a developer of a test failure for the code. Test code is performable on some product code as further product code is being developed.

In certain example embodiments, a software product development- and testing-related method is provided. The method comprises: receiving an indication of code related to a software product being developed; updating a configuration structure stored in a data store to include an entry for the code and storing the code to a test code repository, provided that the code relates to a new test for the software product being developed, wherein the entry specifies one or more parts of the software product being developed to which the code is applicable; and storing the code to the test code repository, provided that the code is an update to a test already existing in the test code repository. The method further comprises, provided that the code is product development code related to the software product being developed: identifying one or more tests applicable to the code using the configuration structure; automatically running each identified test on the code; and provided that each identified test is passed, promoting the code to a product code repository for use with the software product being developed, and otherwise alerting a developer of a test failure for the code. Test code is performable on some product code as further product code is being developed.

In certain example embodiments, a non-transitory computer readable storage medium tangibly stores instructions that, when executed by a processor of a computing system, perform operations comprising: receiving an indication of code related to a software product being developed; updating a configuration structure stored in a data store to include an entry for the code and storing the code to a test code repository, provided that the code relates to a new test for the software product being developed, wherein the entry specifies one or more parts of the software product being developed to which the code is applicable; and storing the code to the test code repository, provided that the code is an update to a test already existing in the test code repository. Provided that the code is product development code related to the software product being developed: one or more tests applicable to the code is/are identified using the configuration structure; each identified test is automatically run on the code; and provided that each identified test is passed, the code is promoted to a product code repository for use with the software product being developed, and otherwise alerting a developer of a test failure for the code. Test code is performable on some product code as further product code is being developed.

According to certain example embodiments, each entry in the configuration structure may further include a location for a corresponding test.

According to certain example embodiments, each entry in the configuration structure may specify parts of the software product being developed based on application and module names.

According to certain example embodiments, each entry in the configuration structure may further include one or more identifiers pertaining to the test associated with the entry, e.g., with the one or more identifiers being user-defined and/or automatically extracted from the test associated with the entry.

According to certain example embodiments, the identifying of the one or more tests applicable to the code using the configuration structure may be based on the content of the code for which the indication was received.

According to certain example embodiments, tests may be performable in a product test development environment of a product code developer who initiated a commit operation and as a result generated the indication of the code.

According to certain example embodiments, indications of a first type may be receivable from a testing environment for test code and indications of a second type may be receivable from a product development environment for product development related code.

According to certain example embodiments, at least some tests may be implemented as test automation scripts.

Certain example embodiments relate to a product development environment for use with the systems described herein. Similarly, certain example embodiments relate to a testing environment for use with the systems described herein. In this manner, systems, non-transitory computer readable storage media, and methods directed to the product developer perspective and the QA perspective, both collectively and individually, are contemplated herein.

In this regard, in certain example embodiments, a software product development- and testing-related system is provided (e.g., as directed more to the QA perspective). A data store stores a configuration structure. A memory and at least one processor are configured to cooperate to perform operations comprising: receiving test code related to a software product being developed; obtaining information from the received test code, the obtained information indicating at least an aspect of the software product being developed to which the received test code is applicable; determining whether the configuration structure already includes an entry for the received test code, based on the obtained information; responsive to a determination that the configuration structure already includes an entry for the received test code, updating the already-included entry for the received test code in the configuration structure; responsive to a determination that the configuration structure does not already include an entry for the received test code, creating a new entry for the received test code in the configuration structure; and storing the received test code to a test code repository. The received test code is automatically executable on product code involving the aspect of the software product being developed to which the received test code is applicable, in response to a detected commit operation involving that product code by a product code developer. The received test code is performable as further product code is still being developed. Counterpart methods and non-transitory computer readable storage media are contemplated, as well.

According to certain example embodiments, each entry in the configuration structure may further include a location for corresponding test code.

According to certain example embodiments, each entry in the configuration structure may specify parts of the software product being developed based on application and module names.

According to certain example embodiments, each entry in the configuration structure may further include one or more identifiers pertaining to the test code associated with the respective entry, e.g., with the one or more identifiers being user-defined and/or automatically extracted from the test code associated with the entry.

According to certain example embodiments, the identifiers may specify parts of the software product being developed to be tested.

According to certain example embodiments, at least some of the parts may involve integrations between different components.

According to certain example embodiments, the received test code may be automatically identifiable, retrievable, and executable based on the identifier(s) associated therewith.

According to certain example embodiments, a plurality of test codes may be retrievable based on a single product code commit operation, based on information extracted from the code being committed being matched with the identifiers.

The features, aspects, advantages, and example embodiments described herein may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which:

FIG. 6 is an integration matrix for the FIG. 5 illustration;

FIG. 7 shows a configuration structure (e.g., index) prior to a test code commit in accordance with a provided example;

FIG. 8 is an example automation test script, an entry for which is to be added to the FIG. 7 example configuration structure, for the purposes of this example;

FIG. 9 is a portion of an illustrative configuration structure relevant to a test of integration between modules C and B in accordance with the example provided;

FIG. 10 shows the illustrative configuration structure being updated to include a new portion for the newly added test of integration between modules C and B in accordance with the example provided;

FIG. 11 is a portion of the illustrative configuration structure relevant to a test of module C and application 2 in accordance with the example provided; and FIGS. 12-13 show the efforts and time used to build example product code, test it, and release a build of the example product using a conventional approach and the approach of certain example embodiments.

DETAILED DESCRIPTION

Certain example embodiments implement an approach that helps to synchronize a continuous integration and continuous delivery (CI/CD) development model with a Shift Left approach. More particularly, certain example embodiments relate to techniques that help ensure that tests and developer code are synchronized, and in which tests can be executed by a person without that person necessarily knowing which tests are designated for which component in the product being developed. The techniques of certain example embodiments in a sense provide a common framework for both the product development team and testing team, with respect to the product codebase that is being designed and tested.

Figures 1A, 1B:
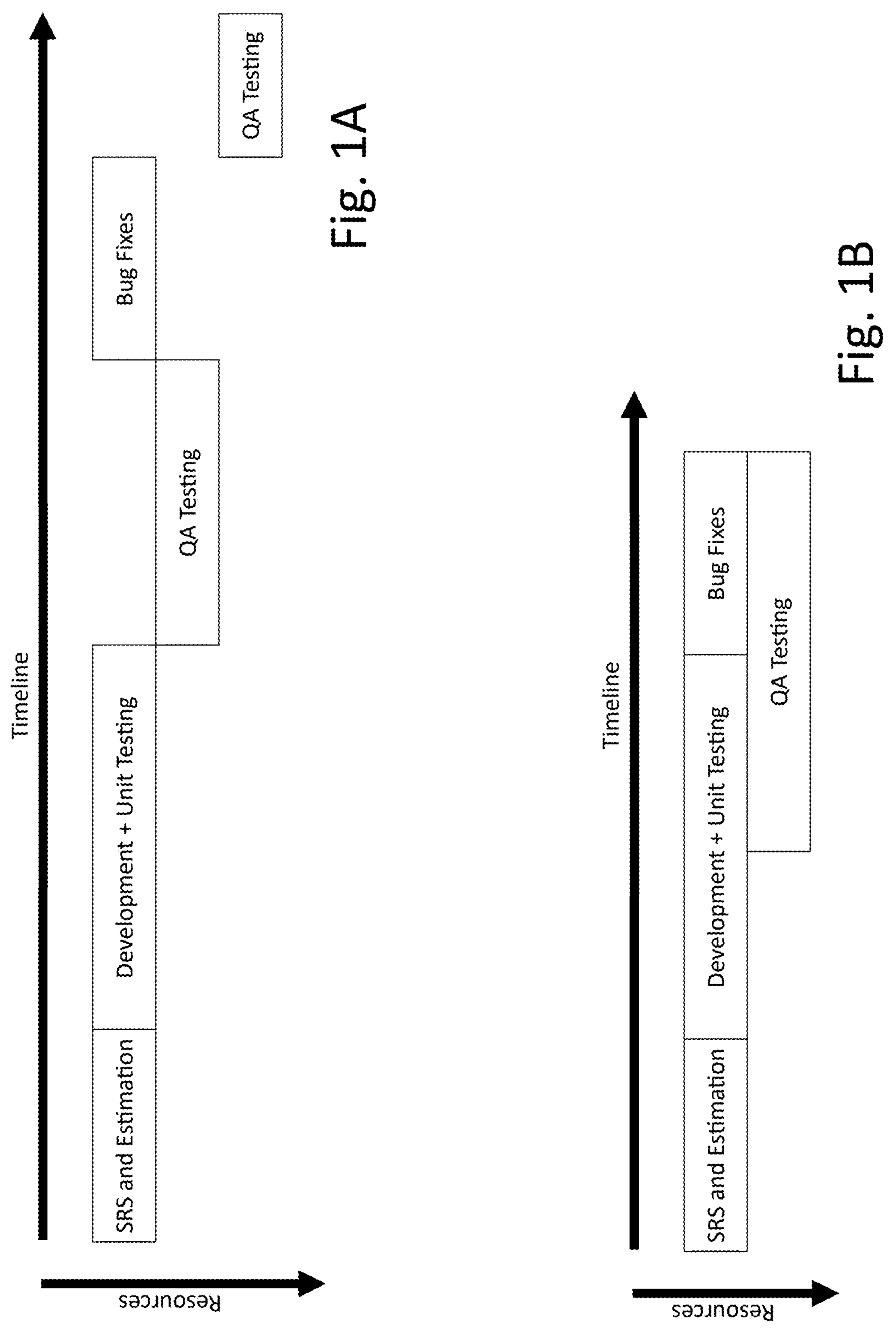
FIG. 1A is a diagram showing a “traditional” software development lifecycle (SDLC)
FIG. 1B is a diagram showing an improvement to the SDLC, reflective of the “Shift Left” approach.
Figures 2A, 2B:
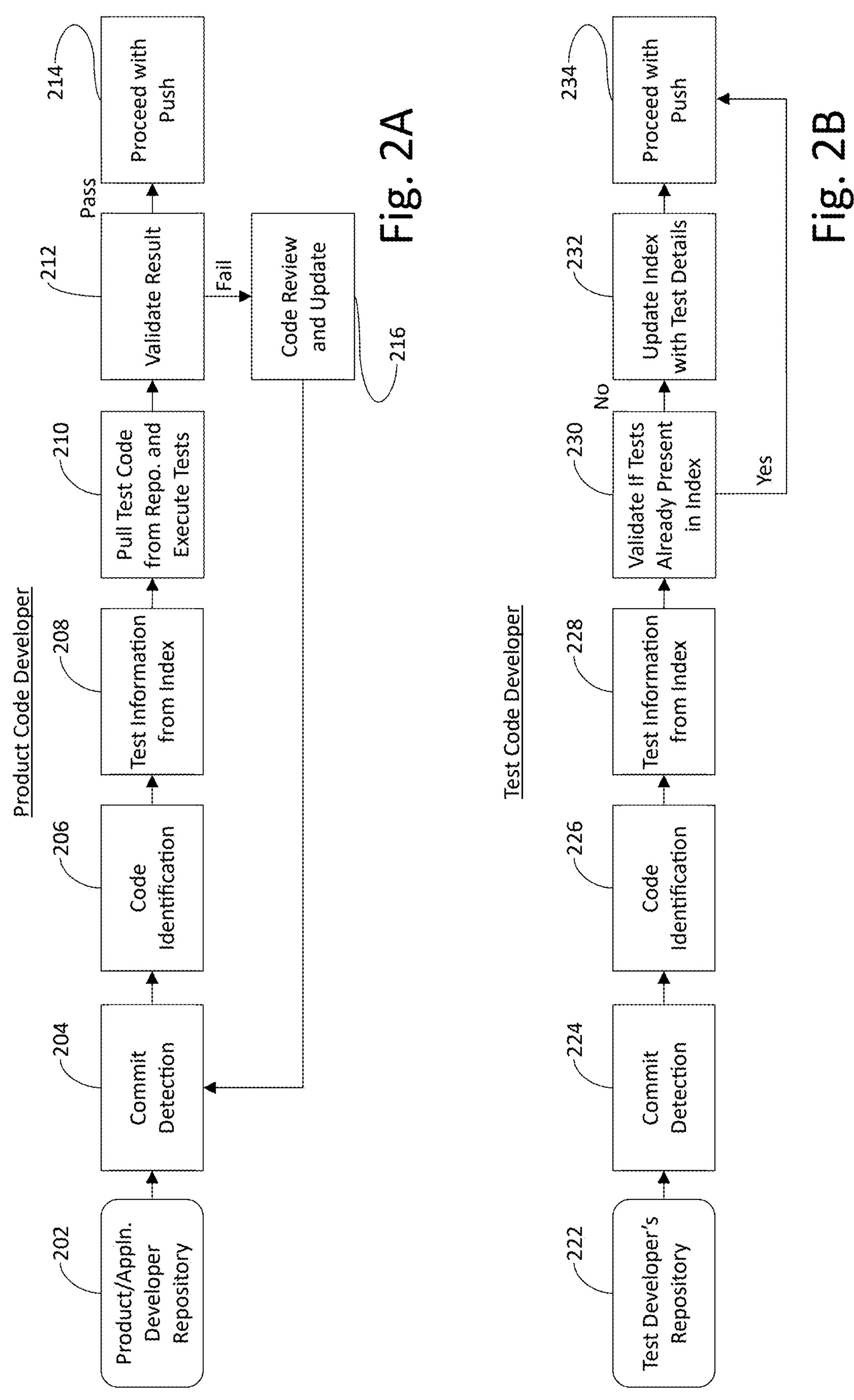
FIG. 2A is a flowchart showing how a product code developer may leverage techniques of certain example embodiments.
FIG. 2B is a flowchart showing how a test code developer may leverage techniques of certain example embodiments.

In this regard, FIG. 2A is a flowchart showing how a product code developer may leverage techniques of certain example embodiments, and FIG. 2B is a flowchart showing how a test code developer may leverage techniques of certain example embodiments. Referring first to FIG. 2A, product code exists in one or more product developer repositories 202. The one or more product developer repositories 202 may be local to and/or remote from the product code developer in different example embodiments. When there is an operation committing product code to a version control system (VCS) or otherwise, the commit operation is detected in step 204. Code identification is performed in step 206, e.g., to determine what kind of product code (e.g., what unit the product code represents, what (if any) units are being integrated, etc.) is being submitted for the commit and to enable a determination about what test(s) is/are to be executed for the product code. In step 208, test information is retrieved from a configuration structure (e.g., a shared or common index or other structure as described in greater detail below). Test code is retrieved from the appropriate repository, and tests are executed, in step 210. The results of the testing are validated in step 212. If the product code passes the testing as determined in step 212, the product code is pushed (e.g., to a staging server, production server, an area of a development system, etc.) for further use in step 214. However, if the testing indicates a failure, then the product code is to be reviewed and updated in step 216, and then the updated product code is re-committed, such that the process returns to step 204.

Referring to FIG. 2B, a test developer's repository 222 is local to and/or remote from the test code developer in different example embodiments (and the test developer's repository 222 may be the same as or different from the one or more product developer repositories 202, in certain example embodiments). The test developer's repository 222 may include test code developed by the testing team. The test code may include automation scripts and/or the like, for QA, integration, and/or other unit testing purposes. When there is an operation committing test code to the test developer's repository 222, the commit operation is detected in step 224. Test code identification is performed in step 226 (e.g., to identify what product code structures, interactions, or other features are implicated by the test code), and test information is retrieved from the configuration structure (e.g., as described in greater detail below) in step 228. In step 230, a determination is made as to whether the test code submitted for the commit is an update to already-present test code (e.g., as determined with reference to the configuration structure). If so, the push continues in step 234 as an update. If not, the configuration structure is updated in step 232 with details regarding the new test, prior to proceeding with the push in step 234.

Certain example embodiments seek to improve the application's quality, stability, and maintainability. In order to facilitate an understanding of the techniques of certain example embodiments that help contribute to these and/or other improvements to the application being developed, an example of a codebase designed in Java is used. It will be appreciated, however, that other programming languages may be used in place of, or in addition to, Java. Thus, the invention is not limited to a Java-based implementation with regard to product code and/or test code. Likewise, the invention is not limited to test code being automation scripts.

One tool for helping to ensure application quality, stability, and maintainability relates to code organization. In this regard, certain example embodiments implement a modular and organized structure by treating the codebase as being divided into logical divisions. In the case of Java, logical divisions may be created for packages and classes, e.g., based on their functionality and responsibilities. This approach helps improve code maintainability and readability. Adherence to best practices for naming conventions also helps to ensure that classes, methods, variables, and/or other objects have meaningful and descriptive names. In certain example embodiments, the divisions are logical in the sense that the code is not physically divided into separate areas but rather is treated as different identifiable distinct parts. Naming conventions can aid with the logical division approach of certain example embodiments, e.g., by specifying namespaces, applications, modules, etc., in accordance with a defined convention.

Another tool relates to version control. To manage source code changes effectively, enable collaboration, and track different versions of the application (product), a version control system may be used. One example of a centralized VCS is Git, although different example embodiments may use other centralized or decentralized VCSs in addition to or in place of Git. The use of a VCS advantageously helps to maintain a history of changes, and can facilitate code roll-backs if/when needed. Certain example embodiments maintain separate repository branches for product code and testing code, allowing product development and quality assurance/test developer teams to work concurrently on their respective tasks. This arrangement also helps promote parallel work, and streamline the product development and testing processes in certain example embodiments.

A configuration structure is maintained and stores information including what tests are being maintained, where to look for those tests, and selective tags for executing chosen tests. The configuration structure may be implemented as an index in certain example embodiments. In certain example embodiments, the configuration structure may be stored in a centralized or other repository, e.g., so that it is accessible by the product/application developer and test developer teams. The index may be stored in any suitable format. For example, in certain example embodiments, the index may be structured as a comma-separated values (CSV) file to store test code repository location information, tags, and the functional modules that these tests aim to cover. In certain example embodiments, product/application developers have read access to the index, whereas QA/test code developers have both read and write access.

Figure 3:
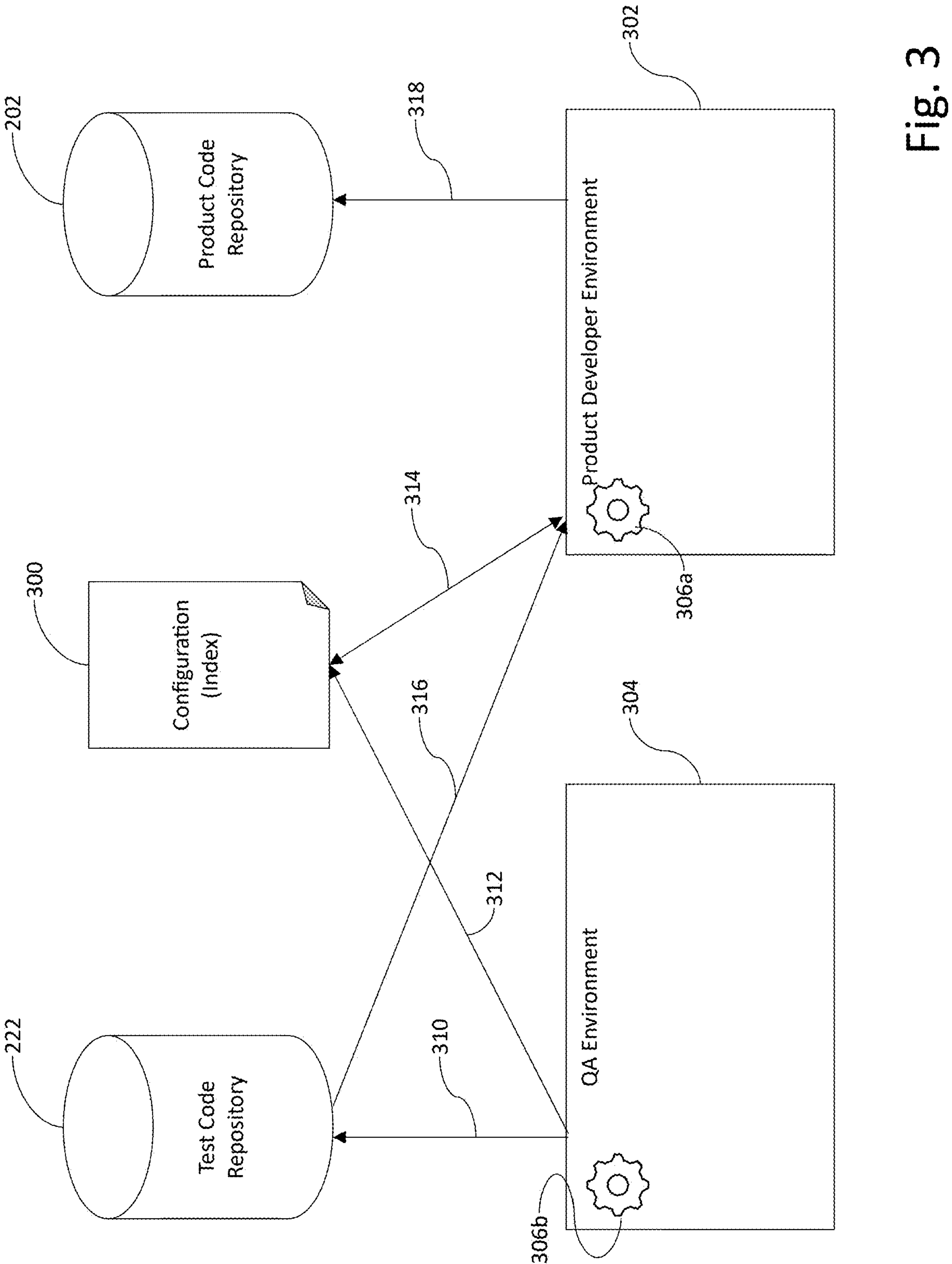
FIG. 3 is a block diagram showing an example implementation of a configuration structure (e.g., index) being updated in accordance with certain example embodiments.

As will be appreciated from FIG. 2B, when QA testers develop test code (e.g., develop test automation scripts and/or the like) and commit that code to the appropriate test code repository, the configuration structure is updated depending on whether the index has an entry. FIG. 3, discussed in greater detail below, is a block diagram showing an example implementation of a configuration structure (e.g., index) 300 being updated in accordance with certain example embodiments.

The QA/test developer creates test code (e.g., automation scripts or the like) during the product development phase and maintains that code in the test code repository 222. Similarly, automation scripts and/or the like for tests such as sanity, system, integration, performance, and security, may be maintained in the test code repository 222, or in one or more separate test repositories (e.g., maintained by their respective teams).

The table below represents an example configuration structure, which may be used in connection with certain example embodiments. The table or other representation may be structured as a table, saved as a CSV file, defined in accordance with a JSON structure or XML schema, and/or the like.

| TestID | Product | Modules | Tests | Repository | Tag(*) |
|---|---|---|---|---|---|
| SCI010 | App1 | A, B | Verify Module AB integration for functionality X | C2E/TestRepo_AB_integration | ABtest_function_X |
| CI011 | App1 | A, C | Verify Module AC integration for functionality Y | C2E/TestRepo_AC_integration | ACtest_function_X |
| CI012 | App1 | C | Verify Module C functionality Z | C2E/TestRepo_C | Ctest_function_Z |
| SCI013 | App1 | A | Verify Module A functionality K | C2E/TestRepo_A | Atest_function_K |
| SCI014 | App1 | B, C | Verify Module B functionality L | C2E/TestRepo_BC | Atest_function_L |

The configuration structure includes a test identifier for a given test. The product field identifies the product/application to which the test is applicable, and the modules field similarly identifies one or more modules of the associated product/application to which the test is applicable. When two or more modules are listed, the entry may be indicating that the associated test pertains to the integration between the two identified products. For example, a listing of “A,B” may be used to indicate that the test is aimed at checking whether changes made to module A have any impact on module B in the product code. The order may imply a directionality of the test in certain example embodiments (e.g., “A,B” may indicate that the test looks for whether changes made to module A have any impact on module B), or they may be multi-directional (e.g., “A,B” may indicate that the test looks for whether changes made to module A have any impact on module B and vice versa, while “A,B,C” may indicate whether a change to any one of modules A-C has an impact on any of the other modules). The tests field provides an understandable description of the test, which may be provided by the user or generated by the system in different example embodiments. The repository field provides a location of the test code (which may include, for example, an identification of the test code repository). In certain example embodiments, a URL (e.g., for a Git or other source code repository), URI, or other identifier may be provided. The tags field include optional labels or other identifiers that may be used to identify the test. These tags may be selected from a list in certain example embodiments. In certain example embodiments, the list may be product developer generated. In certain example embodiments, the list may generated automatically, e.g., certain example embodiments may maintain a list of units of a desired granularity, integrations, etc., automatically, based on information extracted from code submitted to the product code repository.

In certain example embodiments, the configuration structure is created by the testers, e.g., when the product development and QA teams decide on a list of modules to be developed and tested (e.g., as a result of SRS and estimation work and/or through the development process(es)). The QA testers may be responsible for finding integrations between modules in certain example embodiments. In certain example embodiments, every module will have at least have one entry in the configuration structure, e.g., as each module will have a use of its own and/or an integration with something else.

Referring now more particularly to FIG. 3, the product code developer environment 302 and the test code (QA) developer environment 304 are shown. Certain example embodiments implement one or more agents. The agent(s) has/have two roles, one for the product code developer environment 302 and one for the test code (QA) developer environment 304. In certain example embodiments, a first instance of the agent 306*a* operates in the product code developer environment 302, and a second instance of the agent 306*b* operates in the test code developer environment 304. In certain example embodiments, different agents may be provided to serve these two different environments.

The second instance of the agent 306*b* in essence performs the operations shown in FIG. 2B. That is, the second instance of the agent 306*b* serves as a utility to track the changes made by a test code developer. It identifies changes to the test code and maps the tests to corresponding product source code using entries available in the configuration structure 300. It also updates the information about the relevant modules and test details in the configuration structure 300 located in a repository. If a change introduced by a test developer is merely an update to an existing test, the configuration structure 300 remains unaltered. However, if it constitutes a new test, then the configuration structure 300 is updated by adding a new entry. FIG. 3 thus shows new/updated test code being uploaded to the test code repository 222 from the test code environment 304 (step 310), and the configuration structure 300 being updated to reflect the new/updated test code being uploaded (step 312).

The first instance of the agent 306*a* in essence performs the operations shown in FIG. 2A. That is, the first instance of the agent 306*a* serves as a utility to track the commits made by a product code developer before creating a pull request, or requesting to push changes to the product code repository 202. Upon identifying a product code update, the first instance of the agent 306*a* analyses the changed code and retrieves information about the relevant tests from a configuration structure 300 (step 314). The retrieval may be based on, for example, an identifier of the code, the code's class file name, a unit being built, integrations associated with the unit being worked on, etc. Other details about how this information may be derived are provided below. Once the test information is gathered from the configuration structure 300, the first instance of the agent 306*a* pulls the respective test from the test code repository 222 onto a target test environment and executes the retrieved (step 316). The target test environment may be within or external to the product developer environment 302 in certain example embodiments. Based on the validation results from the retrieved test code, in certain example embodiments, the first instance of the agent 306*a* provides the product code developer with the option to either push the local code to the product code repository 202 (step 318) or review the last commit. In certain example embodiments, if the test code validates the product code being developed, the product code is automatically pushed to the product code repository 202.

In this way, indications of code related to a software product being developed are received by the agents (or agent instances). The indications will have a first type if the code is from a testing environment (and thus for test code) and will have a second type if the code is from a product development environment (and thus for product development related code). An indication itself thus may include an indication of a commit operation, a name of the code being developed, a source of the code (e.g., a particular team or team member), the code itself, and/or the like.

Each of the product code developer environment 302 and the test code developer environment 304 includes computing systems usable by the respective developers. For example, the computing systems include, for each developer, a computer terminal and an interface to the applicable repositories and the configuration structure 300. The interfaces may include Internet or other connections, callable Application Programming Interfaces (APIs), web service request technology, and/or the like. The computer terminals include at least one processor and a memory coupled thereto, together with user interface hardware and software. Programming environments (e.g., Java, C++, scripting languages, etc.) are accessible via the computer terminals. The agents, or agent instances, may run on these or other computer terminals. A coordinating application may provide access to the agents as well as the programming environments.

Figure 4:
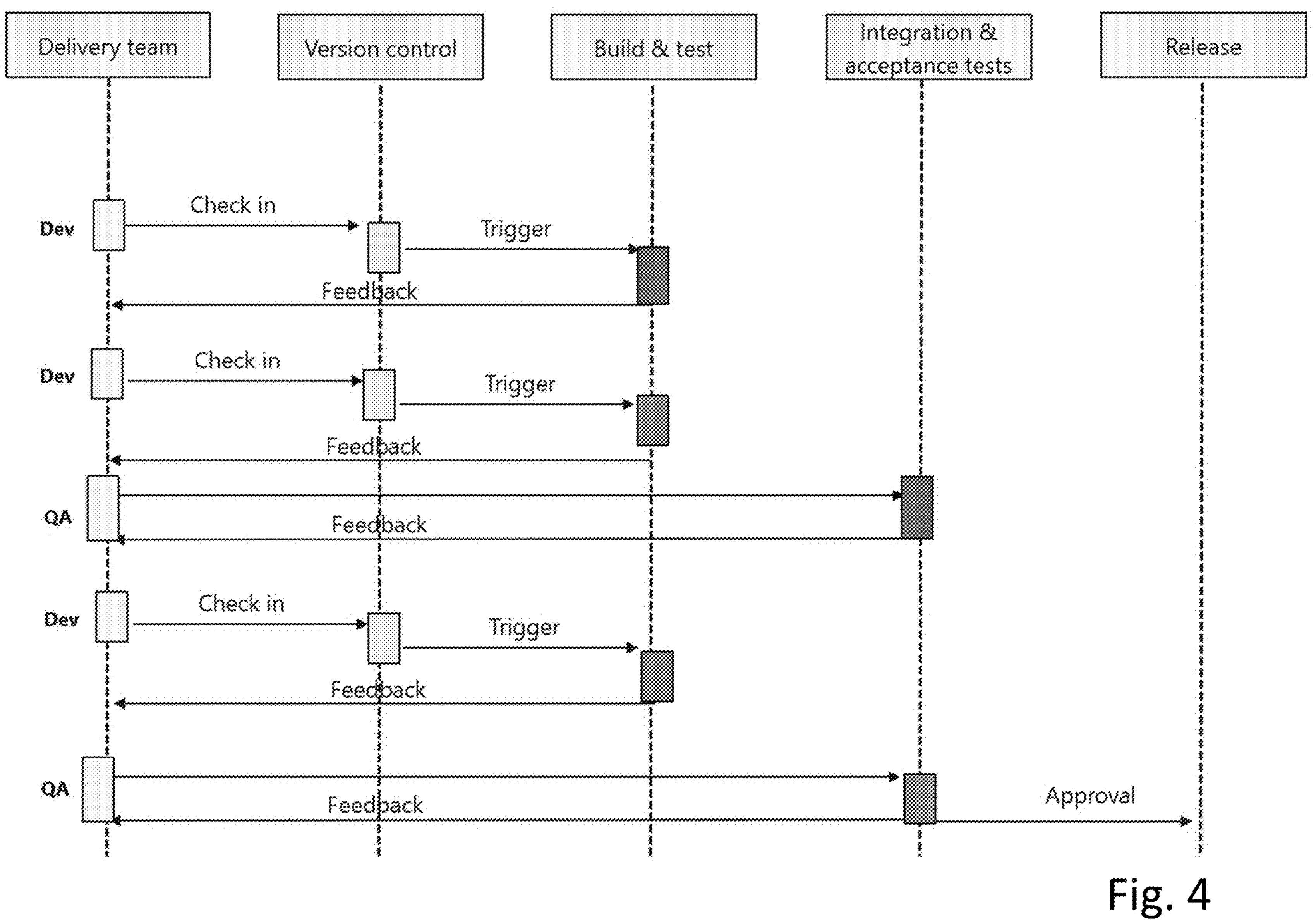
FIG. 4 is a diagram summarizing a typical continuous integration and ‘continuous delivery (CI/CD) development model flow.

To help illustrate the functionality of the agent and the entire FIG. 3 example system, which caters to both product developers and test developers, consider the following. With a typical continuous integration and continuous delivery (CI/CD) development model, a product code developer commits code to the development branch of the product code repository. A round of module level testing is performed, e.g., by the product code developer, and that module level testing may be performed locally on the product developer's own machine or in a dedicated environment. If any failures occur, the product developer updates his/her own code and commits the changes again. This process continues until a stable build becomes available. During this stage, test code developers work on developing automation scripts and the like, e.g., to test these builds for both regression and upcoming feature testing. Once a stable build is obtained, it is handed over to the QA testing team for further testing, including integration and acceptance testing. When the build becomes available for the QA testing team, the QA testing team initiates the testing in an isolated environment and provides feedback once the testing is complete. In the case of a failure, the product code developer reworks the product code and provides another with fixes. If successful, the QA testing team approves the tested build, e.g., for release. FIG. 4 is a diagram summarizing this typical CI/CD development model flow.

Figure 5:
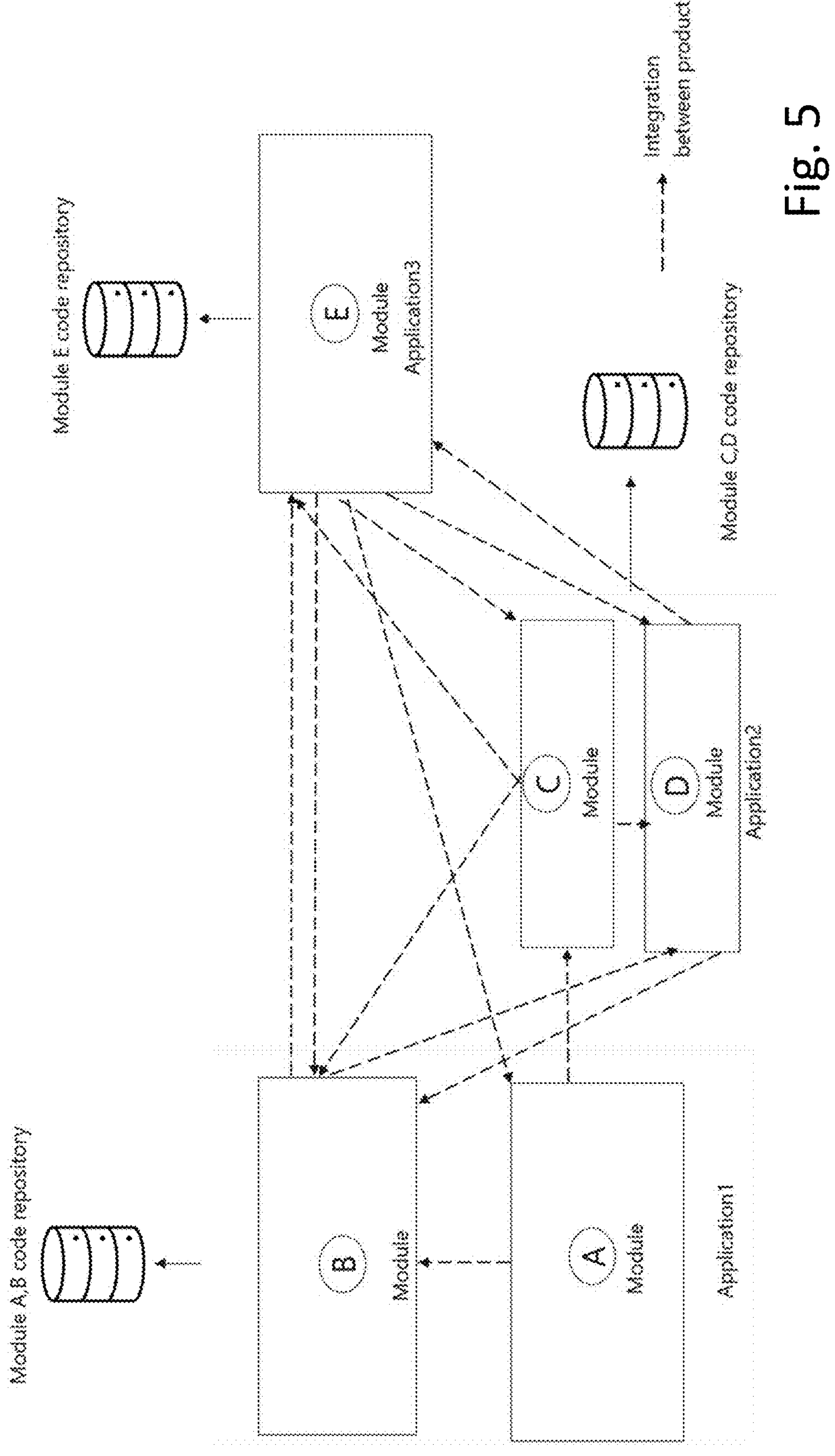
FIG. 5 is a diagram showing how applications and modules may be integrated into a product for the purposes of illustration.

Consider now the same basic flow, with the techniques of certain example embodiments being used to enhance the CI/CD development model flow. Assume, for the purposes of this illustration, that an organization has three applications named Application1, Application2, and Application3. Assume further that Application1 has two modules named A and B, that Application2 has two modules named C and D, and that Application3 has one module named E. FIG. 5 is a diagram showing how these applications and modules may be integrated into a product for the purposes of this illustration. It will be appreciated that this FIG. 5 diagram is provided for purposes of this illustration and that these and/or other applications, modules, integrations, etc., may be used in different example embodiments. FIG. 6 is an integration matrix for the FIG. 5 illustration. In FIG. 6, the row and column headers represent modules, and a "Y" in a cell designates that there is an integration between the modules identified in the row and column, whereas an "N" in a cell designates that there is no integration between the modules identified in the row and column.

In many instances, the product code developer(s) of each module know(s) the "ins and outs" of the respective module. For example, the product code developer(s) typically will know the inputs and outputs, APIs and/or web services called, main functionality performed, etc. However, they often have limited knowledge regarding the integration of their module(s) with other applications and their respective modules. For example, a product code developer may know that a module is supposed to interact with another module, but may have little to no information about what that other module is, what input it takes, what it does or why, etc. And as can be seen from FIG. 5, the integration between applications and modules can become very complex, quite quickly (e.g., with only a few applications and a few modules). Because of these technical challenges in knowing what modules are integrated with what other modules and how, it in turn becomes technically challenging for any product code developer to own the responsibility to decide which tests should be executed to validate the integration functionality alone. Product code testers therefore typically depend on QA and other testers to own this responsibility.

Certain example embodiments empower product code developers to initiate tests themselves and receive feedback. Thus, although testers can themselves still execute tests, they are not necessarily needed in certain example instances. As a result, QA and test teams can focus their responsibilities on software requirements specification (SRS) review and creation of test scenarios and test cases, as well as definition of manual and automated tests. Product code developers in turn can more directly interface with tests, making what otherwise would be downtime associated with waiting more productive.

To help demonstrate this approach, consider the following. FIG. 7 shows a configuration structure (e.g., index) prior to a test code commit in accordance with the example provided. Assume now that a test code developer wants to add a new automation test script test to the configuration structure, with the new automation test script test corresponding to the code shown in FIG. 8. In other words, FIG. 8 is an example automation test script, an entry for which is to be added to the FIG. 7 example configuration structure, for the purposes of this example. The test code developer utilizes test tags or other identifiers available in an automation framework to categorize the test being added. Example test frameworks include behavior-driven development (BDD) and other tools, such as, for example, Cucumber, TestNG, etc. As shown in FIG. 7, the QA team has automated a test for the module com.application2.moduleC named Verify_ModuleIntegration_CB_for_functionality_Q_Test2. This test was written under the namespace com.test.application2.moduleC. Also, the test code developer has added a tag CB_function_Q_Test2.

The agent (or the instance of the agent) running in the QA environment undertakes several tasks. When a test code developer commits a change, the agent identifies the modifications made (e.g., for QA purposes in an automation script or the like). For instance, the agent may detect the addition of new test code, such as Verify_ModuleIntegration_CB_for_functionality_Q_Test2( ) in the package com.test.application2.module. It understands that a Java file named IntegrationModuleCB_Tests.java has been modified in the package com.test.application2.moduleC and retrieves the changes (which may be added code, changed code, or the like). The new test code has a tag CB_function_Q_Test2, indicating that this test is meant to validate the integration between modules C and B.

In terms of the agent detecting the test code, when QA team member commits code, the agent may gather the information of changed file and parts thereof (e.g., the method(s)/function(s), etc.). To identify changes or additions of new methods or functions in a Java file, for example, a custom script or program may be written. In general, certain example embodiments may parse two versions of a Java or other file and compare the parts thereof (e.g., the methods/functions). A code analysis tool like JavaParser or the like can be used for these or other purposes. The JavaParser Java library allows users to parse and analyze Java source code, for example, and a custom script or program can use JavaParser to detect changes in methods or functions. If a method is present in the current version but not in the previous version, it is considered a new method. JavaParser can be used in combination with a code difference tool like difflib, for example, to detect changes in the body of a method or function. In general, the agent of certain example embodiments will have logic that reads two Java or other source files and compare their methods/functions, e.g., using difflib or the like.

The agent communicates with the test code repository, which contains information about tests and their links to the repository, and communicates with (e.g., retrieves a copy of) the latest configuration structure (or portion thereof). In doing so, the agent is able to retrieve and categorize tests related to the integration between module C and module B, which is the integration implicated in this example. Doing so results in the information in FIG. 9 being retrieved or otherwise obtained. That is, FIG. 9 is a portion of an illustrative configuration structure relevant to a test of integration between modules C and B in accordance with the example provided. If a test with the same name and tag(s) already exists, the agent does not update the configuration structure. However, if there is no existing entry, the configuration structure will be updated. In this example, once the test code developer pushes the latest test code to test code repository, because there is no test with the name Verify_ModuleIntegration_CB_for_functionality_Q_Test2( ) and the tag CB_function_Q_test2, the configuration structure will be updated, and the file will be pushed to the central index repository. In this regard, FIG. 10 shows the illustrative configuration structure being updated to include a new portion for the newly added test of integration between modules C and B in accordance with the example provided.

It will be appreciated that the agent identifies the product name from the package details in certain example embodiments. That is, in certain example embodiments, the first line in the test code file will contain package details such as, for example, com.test.application2.moduleC. In this case, the agent can deduce that this test code pertains to the application2 product. It also will be appreciated that the agent calculates the integration between modules using tags provided by the test code developer in the developed code and updates the modules column in the configuration structure accordingly. In this example, the agent identifies C,B as the module from the tag CB_function_Q_test2.

The agent (or the instance of the agent) running in the product developer environment performs a similar but different set of tasks. When a product code developer commits a change, the agent identifies the changes. If the developer has made a code change in com.application2.moduleC, for example, the agent will identify that there is a change in the respective package. The agent will contact the configuration structure that has information of the tests to be executed for that package. In communicating with (e.g., retrieving a copy of) the latest configuration structure (or portion thereof), the agent will determine the test(s) relevant to the changed code, and the location(s) (e.g., repository link(s)) for any such tests. For example, if a developer has made a change in product code module C in the package com.application2.moduleC, the agent will identify the product name from the package details (e.g., as the first line in the product code file may contain package details such as com.application2.moduleC), and the agent can deduce that this code pertains to the product application2 and the module moduleC. The agent then can retrieve the test(s) involving application2 and integration with module C. In this regard, FIG. 11 is a portion of the illustrative configuration structure relevant to a test of module C and application 2 in accordance with the example provided. As a result of this determination, the agent can retrieve from the test repository the relevant tests and see to their execution in a target test environment in connection with a test suite. That information is shown in the four rightmost columns of FIG. 11.

Based on the validation results, the agents provide the developer with the option to either push the product code being developed to the product code repository, review the last commit, etc. In case of a failure, the developer may be prompted to rework the code and provide a new build with the necessary fixes. If successful, the build can be pushed to final release branch in the product code repository.

Figure 13:
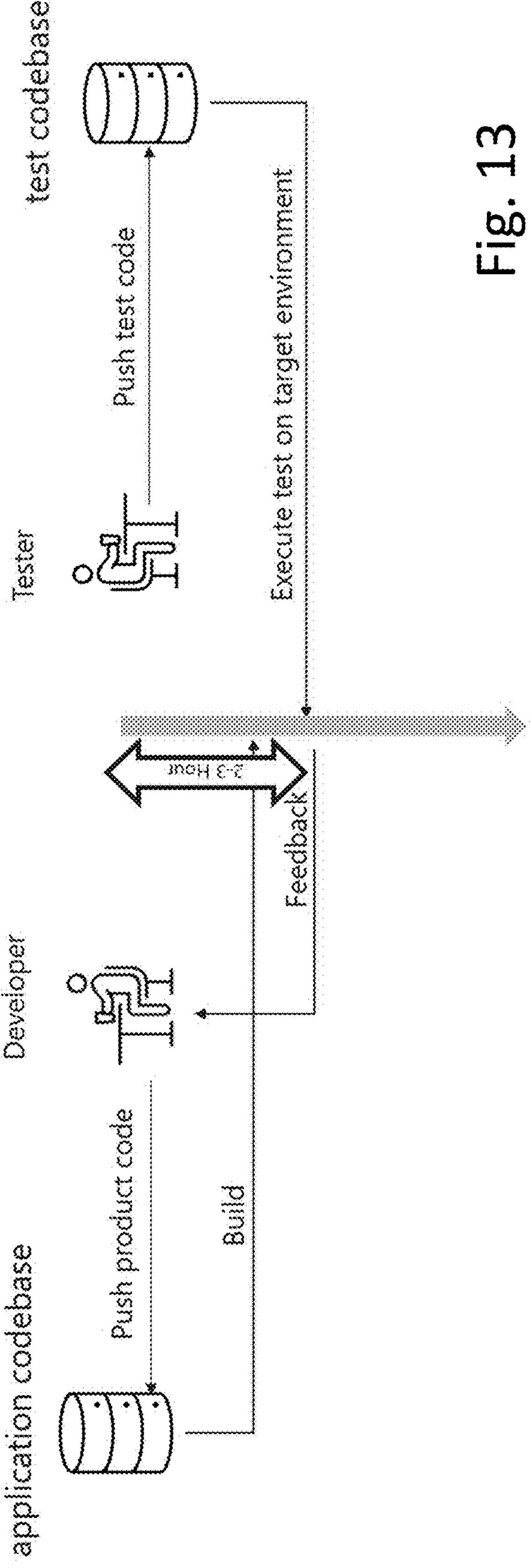

FIGS. 12-13 show the efforts and time used to build example product code, test it, and release a build of the example product using a conventional approach and the approach of certain example embodiments. As can be seen, adopting the FIG. 13 approach shortens the total time required for the release by approximately 30%. In addition to this time reduction, the infrastructure requirements can be reduced as well, e.g., by leveraging the same environment used by the product code developers during the development phase for testing. Thus, the techniques of certain example embodiments result in an improvement to the product development and test environment infrastructures. For instance, certain example embodiments improve the product development toolkit by better integrating testing approaches, e.g., in a manner where the product code developer does not necessarily need to know what tests need to be performed in connection with the product code being developed.

As noted above, certain example embodiments advantageously help enable selective test execution. Selective test execution refers to the practice of choosing specific tests or subsets of tests to be executed rather than running an entire test suite. This selection is based on certain criteria such as, for example, test priorities, specific features, modules, or areas of code that need validation. Selective test execution allows testers to focus on critical or relevant tests, potentially saving time and resources. When specific areas of an application or certain functionalities are modified, executing a subset of tests (e.g., only related tests) helps in verifying the changes without running unnecessary tests. Selective test execution can be implemented using test tags, labels, or markers applied to individual tests or test suites. These tags serve as identifiers that categorize tests based on different criteria such as, for example, functionality, priority, environment, or any other characteristic that helps in filtering and executing tests selectively. As an example, and referring to FIG. 7, there are several tests involving module C. However, a new set of code changes was made specifically between modules C and B. To validate the integration functionality between module C and B, tests that focus on these modules are executed. To do this, certain example embodiments can use the tags CB_Function_Q_Test1 and CB_Function_Q_Test2 during the test suite execution, which will exclusively run the specified tests from the index.

It will be appreciated that as used herein, the terms system, subsystem, service, engine, module, programmed logic circuitry, and the like may be implemented as any suitable combination of software, hardware, firmware, and/or the like. It also will be appreciated that the storage locations, stores, and repositories discussed herein may be any suitable combination of disk drive devices, memory locations, solid state drives, CD-ROMs, DVDs, tape backups, storage area network (SAN) systems, and/or any other appropriate tangible non-transitory computer readable storage medium. Cloud and/or distributed storage (e.g., using file sharing means), for instance, also may be used in certain example embodiments. It also will be appreciated that the techniques described herein may be accomplished by having at least one processor execute instructions that may be tangibly stored on a non-transitory computer readable storage medium.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A software product development- and testing-related system, comprising:

a data store storing a configuration structure; and a memory and at least one processor configured to cooperate to perform operations comprising:

receiving an indication of code related to a software product being developed;

determining whether the configuration structure already includes an existing entry that is associated with the code for the received indication;

based on the code relating to a test that is new for the software product being developed, (a) updating the configuration structure to include an entry for the code that relates to the test that is new for the software product being developed, and (b) storing the code, as test code, to a test code repository, wherein the entry for the configuration structure specifies one or more parts of the software product being developed to which the test code is applicable;

based on the code relating to an update to an existing test that has an existing entry in the configuration structure and existing code in the test code repository, storing the code to the test code repository; and based on the code being product development code related to the software product being developed:

identifying, using the configuration structure, one or more tests applicable to the code;

automatically running each of the identified one or more tests on the code; and based on determination that each of the identified one or more tests has passed, promoting the code, as product code, to a product code repository for use with the software product being developed, and based on determination that any of the identified one or more tests has not passed, generating an alert for a test failure for the code, wherein the test code is performable on some product code as further product code is being developed.

2. The system of claim 1, wherein each entry in the configuration structure further includes a location for a corresponding test code.

3. The system of claim 1, wherein each entry in the configuration structure specifies parts of the software product being developed based on application and module names.

4. The system of claim 1, wherein each entry in the configuration structure further includes one or more identifiers pertaining to the test code that is associated with the entry, the one or more identifiers being user-defined and/or automatically extracted from the test code associated with the entry.

5. The system of claim 1, wherein the identifying of the one or more tests applicable to the code using the configuration structure is based on content of the code for which the indication was received.

6. The system of claim 1, wherein tests are performable in a product test development environment of a product code developer who initiated a commit operation and as a result generated the indication of the code.

7. The system of claim 1, wherein the indication of code includes of a first type of indication that is receivable from a testing environment for the test code and indications of a second type of indication that is receivable from a product development environment for the product development code.

8. The system of claim 1, wherein at least some tests of the identified one or more tests are implemented as test automation scripts.

9. A software product development- and testing-related method, the method comprising:

receiving an indication of code related to a software product being developed;

determining whether a configuration structure already includes an existing entry that is associated with the code for the received indication;

based on the code relating to a test that is new for the software product being developed, (a) updating the configuration structure to include an entry for the code that relates to the test that is new for the software product being developed, and (b) storing the code, as test code, to a test code repository, wherein the entry for the configuration structure specifies one or more parts of the software product being developed to which the test code is applicable;

based on the code relating to an update to an existing test that has an existing entry in the configuration structure and existing code in the test code repository, storing the code to the test code repository; and based on the code being product development code related to the software product being developed:

identifying, using the configuration structure, one or more tests applicable to the code;

automatically running each of the identified one or more tests on the code; and based on determination that each of the identified one or more tests has passed, promoting the code, as product code, to a product code repository for use with the software product being developed, and based on determination that any of the identified one or more tests has not passed, generating an alert for a test failure for the code, wherein the test code is performable on some product code as further product code is being developed.

10. The method of claim 9, wherein each entry in the configuration structure further includes a location for a corresponding test code, and specifies parts of the software product being developed based on application and module names.

11. The method of claim 9, wherein each entry in the configuration structure further includes one or more identifiers pertaining to the test code associated with the entry, the one or more identifiers being user-defined and/or automatically extracted from the test code associated with the entry.

12. The method of claim 9, wherein the identifying of the one or more tests applicable to the code using the configuration structure is based on the content of the code for which the indication was received.

13. The method of claim 9, wherein tests are performable in a product test development environment of a product code developer who initiated a commit operation and as a result generated the indication of the code.

14. The method of claim 9, wherein the indication of code includes of a first type of indication that is receivable from a testing environment for the test code and indications of a second type of indication that is receivable from a product development environment for the product development code.

15. A non-transitory computer readable storage medium tangibly storing instructions that, when executed by a processor of a computing system, perform operations comprising: receiving an indication of code related to a software product being developed;

determining whether a configuration structure already includes an existing entry that is associated with the code for the received indication;

based on the code relating to a test that is new for the software product being developed, (a) updating the configuration structure to include an entry for the code that relates to the test that is new for the software product being developed, and (b) storing the code, as test code, to a test code repository, wherein the entry for the configuration structure specifies one or more parts of the software product being developed to which the test code is applicable;

based on the code relating to an update to an existing test that has the existing entry in the configuration structure and existing code in the test code repository, storing the code to the test code repository; and based on the code being product development code related to the software product being developed:

identifying, using the configuration structure, one or more tests applicable to the code;

automatically running each of the identified one or more tests on the code; and based on determination that each of the identified one or more tests has passed, promoting the code, as product code, to a product code repository for use with the software product being developed, and based on determination that any of the identified one or more tests has not passed, generating an alert for a test failure for the code, wherein the test code is performable on some product code as further product code is being developed.

16. The non-transitory computer readable storage medium of claim 15, wherein each entry in the configuration structure further includes a location for corresponding test code, and specifies parts of the software product being developed based on application and module names.

17. The non-transitory computer readable storage medium of claim 15, wherein each entry in the configuration structure further includes one or more identifiers pertaining to the test code associated with the entry, the one or more identifiers being user-defined and/or automatically extracted from the test code associated with the entry.

18. The non-transitory computer readable storage medium of claim 15, wherein the identifying of the one or more tests applicable to the code using the configuration structure is based on content of the code for which the indication was received.

19. The non-transitory computer readable storage medium of claim 15, wherein tests are performable in a product test development environment of a product code developer who initiated a commit operation and as a result generated the indication of the code.

20. The non-transitory computer readable storage medium of claim 15, wherein the indication of code includes of a first type of indication that is receivable from a testing environment for the test code and indications of a second type of indication that is receivable from a product development environment for the product development code.

21. A product development computing system for use with the software product development- and testing-related system of claim 1, the product development computing system comprising at least one hardware processor coupled to memory, the at least one hardware processor configured to perform operations comprising:

providing, to the software product development- and testing-related system, the indication of code related to the software product being developed, wherein the code is product development code related to the software product being developed.

22. A testing environment computer system for use with the software product development- and testing-related system of claim 1, the testing environment computer system comprising at least one hardware processor coupled to memory, the at least one hardware processor configured to perform operations comprising:

providing, to the software product development- and testing-related system, the indication of code related to the software product being developed, wherein the code is test code.

23. A software product development- and testing-related system, comprising:

a data store storing a configuration structure that includes a plurality of entries that each relate to a different test, where each entry of the plurality of entries includes: 1) a location for where corresponding test code of a corresponding test is located in a code repository, and 2) data for at least a portion of product code for which the corresponding test code is to be applied; and a memory and at least one processor configured to cooperate to perform operations comprising:

receiving test code related to a software product being developed;

obtaining information from the received test code, the obtained information indicating at least an aspect of the software product being developed to which the received test code is applicable;

determining, based on the obtained information, whether the configuration structure already includes an existing entry that is associated with for the received test code, based on the obtained information;

responsive to a determination that the configuration structure already includes the existing entry that is associated with the received test code, updating, in association with the location for the existing entry, the corresponding test code in the code repository based on the received test code;

responsive to a determination that the configuration structure does not already include the existing entry that is associated with the received test code:

1) Creating a new entry for the received test code in the configuration structure; and 2) Storing, to a new location within the code repository, the received test code, wherein the location of the new entry is set as the new location;

wherein the received test code is automatically executable on the product code involving the aspect of the software product being developed to which the received test code is applicable, in response to a detected commit operation involving the product code by a product code developer, and wherein the received test code is performable as further product code is still being developed.

24. The system of claim 23, wherein each of the data of at least the portion of the product code for which the corresponding test code is to be applied specifies parts of the software product being developed based on application and module names.

25. The system of claim 23, wherein each entry in the configuration structure further includes one or more identifiers pertaining to the test code associated with a respective entry, the one or more identifiers being user-defined and/or automatically extracted from the test code associated with the respective entry.

26. The system of claim 25, wherein the one or more identifiers specify parts of the software product being developed to be tested.

27. The system of claim 26, wherein at least some of the parts involve integrations between different components.

28. The system of claim 25, wherein the received test code is automatically identifiable, retrievable, and executable based on the one or more identifiers associated therewith.

29. The system of claim 28, wherein a plurality of test codes are retrievable based on a single product code commit operation, based on information extracted from the product code being committed matching with the one or more identifiers.

* * * * *